(12) United States Patent
Mizukami et al.

(10) Patent No.: US 9,512,781 B2
(45) Date of Patent: Dec. 6, 2016

(54) COOLING STRUCTURE FOR RECOVERY-TYPE AIR-COOLED GAS TURBINE COMBUSTOR

(75) Inventors: Satoshi Mizukami, Tokyo (JP); Tatsuo Ishiguro, Tokyo (JP); Junichiro Masada, Tokyo (JP); Kazumasa Takata, Tokyo (JP); Shunsuke Torii, Tokyo (JP); Yuya Fukunaga, Tokyo (JP); Tetsu Konishi, Tokyo (JP); Yoshiaki Nishimura, Miyagi (JP); Yoshiaki Igarashi, Miyagi (JP); Shinya Ishikawa, Miyagi (JP)

(73) Assignees: MITSUBISHI HITACHI POWER SYSTEMS, LTD., Kanagawa (JP); TOHOKU ELECTRIC POWER CO., INC., Miyagi (JP)

( * ) Notice: Subject to any disclaimer, the term of this patent is extended or adjusted under 35 U.S.C. 154(b) by 786 days.

(21) Appl. No.: 13/806,523

(22) PCT Filed: Aug. 10, 2011

(86) PCT No.: PCT/JP2011/068234
§ 371 (c)(1),
(2), (4) Date: Dec. 21, 2012

(87) PCT Pub. No.: WO2012/043073
PCT Pub. Date: Apr. 5, 2012

(65) Prior Publication Data
US 2013/0098063 A1  Apr. 25, 2013

(30) Foreign Application Priority Data

Sep. 30, 2010  (JP) .................................. 2010-222494

(51) Int. Cl.
*F02C 7/12*  (2006.01)
*F02C 6/08*  (2006.01)
(Continued)

(52) U.S. Cl.
CPC ................. *F02C 7/18* (2013.01); *F01D 9/023* (2013.01); *F02C 7/08* (2013.01); *F02C 7/24* (2013.01);
(Continued)

(58) Field of Classification Search
CPC ............ F23R 3/002; F23R 2900/03043; F23R 2900/03045; F02C 7/16; F02C 7/18; F02C 6/08; F02C 9/18
See application file for complete search history.

(56) References Cited

U.S. PATENT DOCUMENTS 4,719,748 A *  1/1988  Davis et al. ..................... 60/760
6,282,905 B1 *  9/2001  Sato et al. ....................... 60/752
(Continued)

FOREIGN PATENT DOCUMENTS

JP  59-056618 A  4/1984
JP  59-110336 U  7/1984
(Continued)

OTHER PUBLICATIONS

Notice of Allowance issued Mar. 5, 2015 in corresponding Chinese patent application No. 201180031511.4.
(Continued)

*Primary Examiner* — Nicholas J Weiss
*Assistant Examiner* — Ngoc T Nguyen
(74) *Attorney, Agent, or Firm* — Wenderoth, Lind & Ponack, L.L.P.

(57) ABSTRACT

In a cooling structure for a recovery-type air-cooled gas turbine combustor having a recovery-type air-cooling structure that bleeds, upstream of the combustor, and pressurizes compressed air supplied from a compressor, that uses the bled and pressurized air to cool a wall, and that recovers and reuses the bled and pressurized air as combustion air for burning fuel in the combustor together with a main flow of
(Continued)

the compressed air, wall cooling in which cooling air is supplied to cooling air passages formed in the wall of the combustor to perform cooling involves a downstream wall region, closer to a turbine, that is cooled using the bled and pressurized air as the cooling air and an upstream wall region, closer to a burner, that is cooled using, as the cooling air, bled compressed air bled from a main flow of the compressed air through a housing inner space.

11 Claims, 16 Drawing Sheets

(51) Int. Cl.
| | | |
|---|---|---|
| *F02C 7/18* | (2006.01) | |
| *F01D 9/02* | (2006.01) | |
| *F02C 7/08* | (2006.01) | |
| *F02C 7/24* | (2006.01) | |
| *F23R 3/00* | (2006.01) | |
| *F23R 3/06* | (2006.01) | |
| *F23R 3/44* | (2006.01) | |

(52) U.S. Cl.
CPC .............. *F23R 3/005* (2013.01); *F23R 3/06* (2013.01); *F05D 2260/202* (2013.01); *F23R 3/44* (2013.01); *F23R 2900/00014* (2013.01)

(56) References Cited

U.S. PATENT DOCUMENTS 7,310,938 B2 * 12/2007 Marcum et al. ................ 60/752
8,720,204 B2 * 5/2014 Schilp et al. ................... 60/725

FOREIGN PATENT DOCUMENTS

| JP | 2001-107748 A | 4/2001 | |
|---|---|---|---|
| JP | 2003-214185 A | 7/2003 | |
| JP | 2004-044538 A | 2/2004 | |
| JP | 2006-220350 A | 8/2006 | |
| JP | 2008-274774 A | 11/2008 | |
| JP | 2009-079483 A | 4/2009 | |
| JP | 2010-090817 A | 4/2010 | |
| JP | 2010-090818 A | 4/2010 | |
| WO | WO 2010041552 A1 * | 4/2010 | ............ F01D 25/10 |

OTHER PUBLICATIONS

Japanese Office Action issued Oct. 21, 2014 is Japanese Patent Application No. 2010-222494.
Korean Notice of Allowance issued Nov. 20, 2014 in Korean Patent Application No. 10-2012-7033636.

* cited by examiner

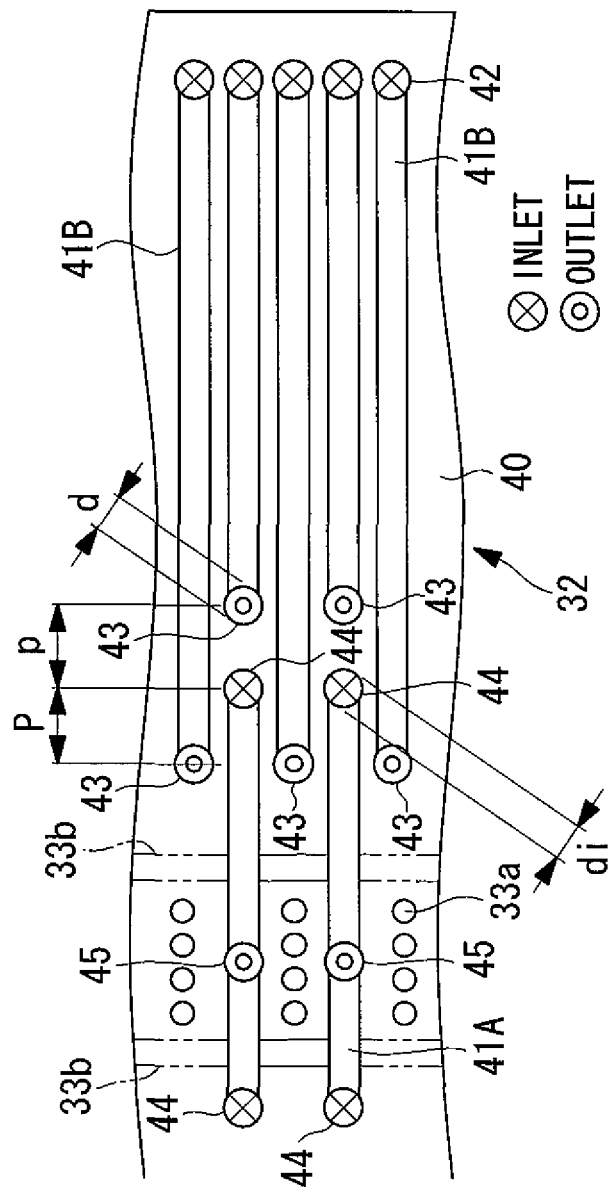

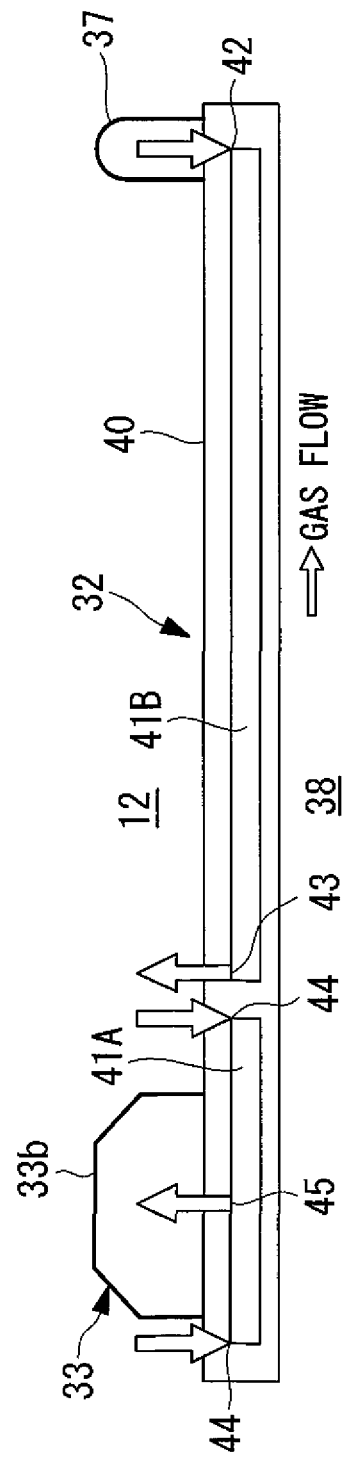

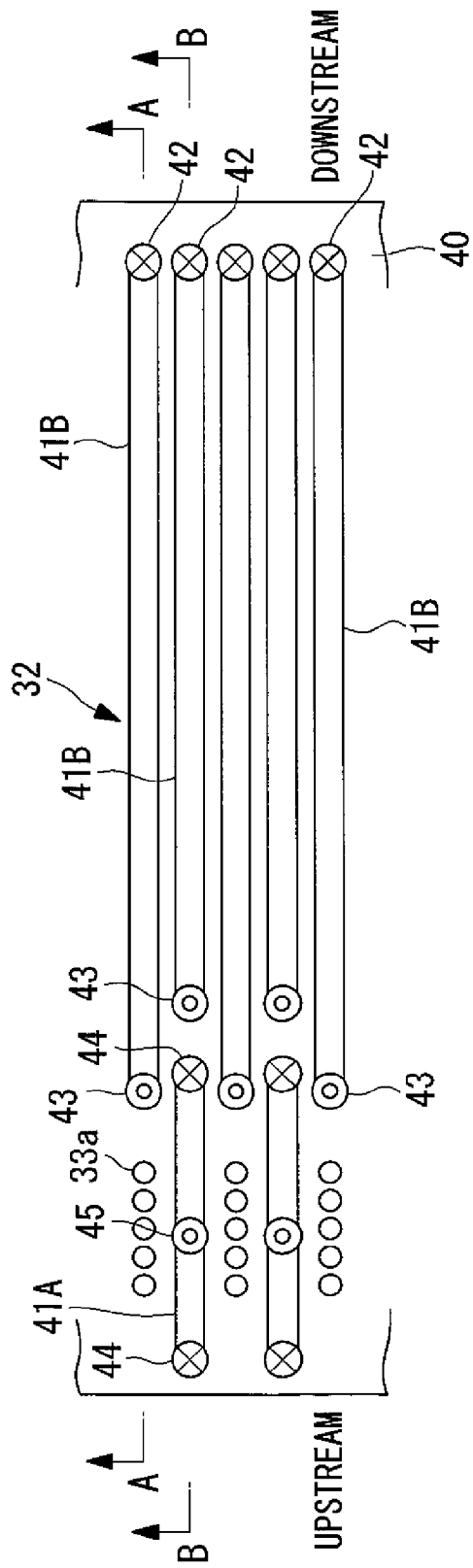

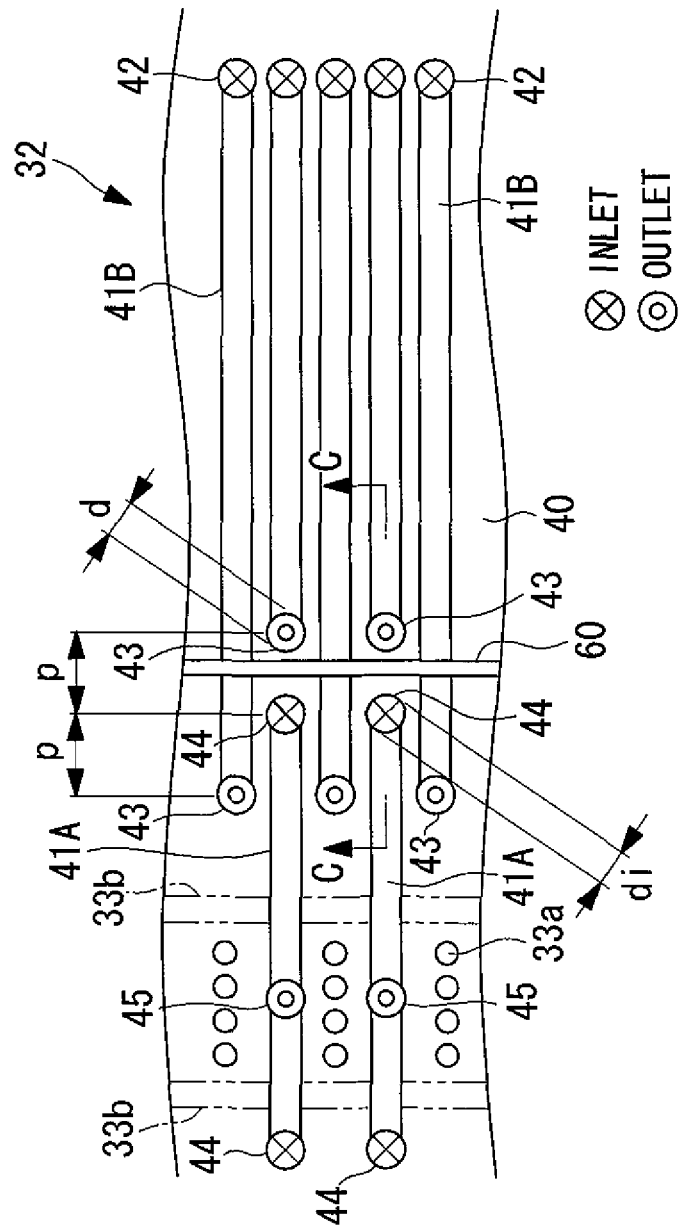

COOLING STRUCTURE FOR RECOVERY-TYPE AIR-COOLED GAS TURBINE COMBUSTOR

CROSS REFERENCE TO RELATED APPLICATIONS

This application is a National Stage of International Application No. PCT/JP2011/068234, filed on Aug. 10, 2011, which claims priority from Japanese Patent Application No. 2010-222494, filed Sep. 30, 2010, the contents of all of which are incorporated herein by reference in their entirety.

TECHNICAL FIELD

The present invention relates to cooling structures for recovery-type air-cooled gas turbine combustors.

BACKGROUND ART

A gas turbine is an apparatus composed mainly of a compressor, a combustor, and a turbine, and the compressor takes in and compresses air to discharge high-pressure compressed air. The compressed air discharged from the compressor is taken into the combustor and is used as combustion air for burning a gas turbine fuel supplied to the combustor to produce a high-temperature combustion gas. This combustion gas is taken into the turbine and flows between rotor blades and stator blades to drive the turbine, thereby producing output power.

In gas turbines in the related art, internal cooling passages of hot components, such as the combustor, the turbine stator blades, and the turbine rotor blades, are broadly divided into three types: open-type air cooling, recovery-type steam cooling, and recovery-type air cooling.

In open-type air cooling, the interior of the hot components is cooled with air, and after cooling, the air is used as air for film cooling.

In recovery-type steam cooling, the interior of the hot components is cooled with steam, and after cooling, the steam is recovered in a steam turbine. Recovery-type steam cooling, therefore, is not applicable to a gas turbine alone.

Recovery-type air cooling is a cooling system that bleeds the compressed air supplied from the compressor as the air to be used for cooling the interior of the hot components and that uses the compressed air to cool the interior of the hot components, and after cooling, the compressed air is recovered and used as combustion air for the combustor. This air cooling system configured to use the compressed air bled from the compressor as cooling air and to recover and reuse the compressed air as combustion air after cooling is also termed a closed air cooling cycle. This system allows for reduced emissions of nitrogen oxides during combustion because the compressed air that has been used for cooling is reused for combustion.

FIG. 14 is a diagram illustrating an air cooling system using compressed air as an example of the recovery-type air cooling system described above, where high-pressure compressed air compressed by a compressor 1 of a gas turbine GT is supplied through a compressed-air supply passage 2 to a combustor 3 for primary use as combustion air.

A branch passage 4 through which a portion of the compressed air is bled is disposed at some location along the compressed-air supply passage 2. This branch passage 4 has a pressurizing device 5 that pressurizes the bled compressed air into pressurized air with a higher pressure.

The outlet of the pressurizing device 5 is connected to the interior of stator blades 8 of a turbine 7 via a pressurized-air passage 6 so that the pressurized air supplied from the pressurizing device 5 is used as cooling air that flows through internal cooling passages of the stator blades 8. After cooling the interior of the stator blades 8, the pressurized air is returned through a return passage 9 to the compressed-air supply passage 2, where it merges with the main flow of the compressed air supplied from the compressor 1.

As a result, the pressurized air that has been used to cool the stator blades 8, together with the compressed air directly supplied from the compressor 1 to the combustor 3, is used as the combustion air for burning the fuel in the combustor 3. Thus, recovery-type air cooling, in which the passage for the compressed air bled from the compressed-air supply passage 2 forms a closed loop that allows the cooling air to be reused without flowing out into a gas path through which a high-temperature combustion gas is flowing, does not increase the inlet temperature of the turbine 7 and is said to be an effective system for improving gas turbine performance.

Another type of recovery-type air cooling is a closed air cooling cycle, such as in a gas turbine GT' shown in FIG. 15, which bleeds and pressurizes the compressed air and supplies the pressurized air to both the stator blades 8 and the rotor blades 10 of the turbine 7 for cooling them. In this case, the branch passage 4 is divided into two lines, one for supplying the pressurized air to the stator blades 8 and the other for supplying the pressurized air to the rotor blades 10.

In the figure, reference sign 5A is a pressurizing device, reference sign 6A is a pressurized-air passage, reference sign 9A is a return passage, and reference sign 11 is a cooling device, all of which are provided in the line for supplying and recovering the pressurized air to and from the rotor blades 10.

PTL (Patent Literature) 1 below, on the other hand, discloses a method for operating a gas turbine at partial load in which compressed air bled from near the outlet of a compressor is pressurized by operating a pressurizing device and is made to flow through a cooling passage in a combustor to perform cooling.

In addition, PTL 2 below discloses a method for operating a gas turbine at rated load in which compressed air bled from near the outlet of a compressor is pressurized by operating a pressurizing device and is made to flow through a turbine coolant passage and a cooling passage in a combustor to perform cooling.

CITATION LIST

Patent Literature

{PTL 1}
Japanese Unexamined Patent Application, Publication No. 2010-90817
{PTL 2}
Japanese Unexamined Patent Application, Publication No. 2010-90818

SUMMARY OF INVENTION

Technical Problem

What is desired for a gas turbine that employs the recovery-type air cooling system (closed air cooling cycle) described above is a cooling structure that can effectively utilize compressed air supplied from a compressor to efficiently cool the wall of a combustor.

In view of the foregoing, it is an object of the present invention to provide, for a recovery-type air-cooled gas turbine combustor, a cooling structure that effectively utilizes compressed air supplied from a compressor to efficiently cool the wall of a combustor.

Solution to Problem

To solve the above problem, the present invention employs the following solutions.

A cooling structure according to the present invention for a recovery-type air-cooled gas turbine combustor is a cooling structure for a recovery-type air-cooled gas turbine combustor having a recovery-type air-cooling structure that bleeds, upstream of the combustor, and pressurizes compressed air supplied from a compressor, that uses the bled and pressurized air to cool a wall of the combustor, and that recovers and reuses the bled and pressurized air as combustion air for burning fuel in the combustor together with a main flow of the compressed air, and wall cooling in which cooling air is supplied to cooling air passages formed in the wall of the combustor to perform cooling involves a downstream wall region, closer to a turbine, that is cooled using the bled and pressurized air as the cooling air and an upstream wall region, closer to a burner, that is cooled using, as the cooling air, bled compressed air bled from a main flow of the compressed air through a housing.

Because the wall cooling in which the cooling air is supplied to the cooling air passages formed in the wall of the combustor to perform cooling involves the downstream wall region, closer to the turbine, that is cooled using the bled and pressurized air as the cooling air and the upstream wall region, closer to the burner, that is cooled using, as the cooling air, the bled compressed air bled from the main flow of the compressed air through the inner space of the combustor housing, the cooling structure of the present invention for the recovery-type air-cooled gas turbine combustor can effectively utilize the bled and pressurized air and the bled compressed air to cool the wall of the combustor.

That is, because wall cooling using the bled and pressurized air is performed in the region of the combustor closer to the turbine (downstream wall region), which is at a relatively high temperature, and wall cooling using the bled compressed air is performed in the region of the combustor closer to the burner (upstream wall region), which is at a relatively low temperature, wall cooling is possible using a reduced amount of bled and pressurized air.

In the above invention, in the downstream wall region, bled and pressurized air introduced from bled-and-pressurized-air inlet holes provided closer to the turbine preferably flows out of bled-and-pressurized-air outlet holes provided closer to the burner in the downstream wall region into an inner space of the housing, and in the upstream wall region, at least bled compressed air introduced from bled-compressed-air inlet holes provided closer to the turbine in the upstream wall region preferably flows out of bled-compressed-air outlet holes provided in the center of the upstream wall region, which allows the bled and pressurized air to be supplied from near an outlet of a tailpipe, which is exposed to a higher heat load, for wall cooling in the downstream wall region, thus allowing wall cooling using a further reduced amount of bled and pressurized air.

In this case, the bled-and-pressurized-air outlet holes and/or the bled-compressed-air inlet holes that are adjacent to each other near a boundary between the upstream wall region and the downstream wall region are preferably arranged in a staggered pattern, which allows the opening positions of the bled-and-pressurized-air outlet holes and/or the bled-compressed-air inlet holes to be dispersed near the boundary between the upstream wall region and the downstream wall region so that the wall can be efficiently cooled.

In the above invention, bled-and-pressurized-air cooling passages that direct the bled and pressurized air introduced from the bled-and-pressurized-air inlet holes to the bled-and-pressurized-air outlet holes and/or bled-compressed-air cooling passages that direct the bled compressed air introduced from the bled-compressed-air inlet holes to the bled-compressed-air outlet holes preferably include turn-back portions that couple together the cooling passages that are adjacent to each other in a circumferential direction of the combustor near the boundary, which allows the opening positions of the adjacent bled-and-pressurized-air outlet holes and bled-compressed-air inlet holes near the boundary to be spaced apart from each other to prevent or inhibit mixing of the bled and pressurized air and the bled compressed air so that the temperature of the compressed air that cools the upstream wall region does not rise.

In this case, the turn-back portions are preferably routed so as to substantially uniformly cover a region near the boundary between the upstream wall region and the downstream wall region to perform wall cooling using the bled and pressurized air and/or the bled compressed air, which allows substantially uniform wall cooling if the turn-back portions are routed through a region separated from the positions of the bled-and-pressurized-air outlet holes and the bled-compressed-air inlet holes.

In the above invention, a partition wall protruding from the wall of the combustor is preferably provided between the bled-and-pressurized-air outlet holes and the bled-compressed-air inlet holes, which allows the flow of the bled and pressurized air out of the bled-and-pressurized-air outlet holes to be reliably separated from the flow of the bled compressed air into the bled-compressed-air inlet holes without being mixed therewith.

In the above invention, the ratio (P/d) of a pitch (P) of the bled-and-pressurized-air outlet holes and the bled-compressed-air inlet holes that are adjacent to each other near the boundary in a longitudinal direction of the combustor to the diameter (d) of the bled-and-pressurized-air outlet holes is preferably set to 2 or more (P/d≥2), which allows a sufficient distance to be provided between the adjacent bled-and-pressurized-air outlet holes and bled-compressed-air inlet holes so that the flow of the bled and pressurized air out of the bled-and-pressurized-air outlet holes and the flow of the bled compressed air into the bled-compressed-air inlet holes are not mixed with each other.

In the above invention, the diameter (di) of the bled-compressed-air inlet holes is preferably set to a value larger than the diameter (d) of the bled-and-pressurized-air outlet holes (di>d), which allows the bled and pressurized air flowing out of the bled-and-pressurized-air outlet holes, which have a smaller diameter, to have a higher velocity, so that the high-temperature bled and pressurized air tends to flow out into the inner space of the housing without being mixed with the bled compressed air, which has a lower velocity. As a result, the bled compressed air flowing into the bled-compressed-air inlet holes tends not to be mixed with the high-temperature bled and pressurized air, thus preventing or inhibiting a temperature rise.

In the above invention, a boundary between the upstream wall region and the downstream wall region is preferably located near an end of an acoustic liner closer to the turbine, which allows the amount of bled and pressurized air to be reduced for improved cycle performance.

Advantageous Effects of Invention

According to the present invention described above, the cooling structure for the recovery-type air-cooled gas turbine combustor, which employs recovery-type air cooling (closed air cooling cycle), can effectively utilize the compressed air supplied from the compressor to perform wall cooling using the bled and pressurized air in the region of the combustor closer to the turbine, which is at a relatively high temperature, and to perform wall cooling using the bled compressed air in the region of the combustor closer to the burner, which is at a relatively low temperature.

As a result, the bled and pressurized air that has been used to cool the downstream wall region of the combustor and the bled compressed air that has been used to cool the upstream wall region of the combustor are both effectively reused as combustion air, thus providing a gas turbine having a cooling structure employing recovery-type air cooling that can efficiently cool the wall of the combustor using a reduced amount of bled and pressurized air, which needs to be pressurized.

BRIEF DESCRIPTION OF DRAWINGS

FIG. 2B is a schematic plan view of the wall cooling system in FIG. 2A as viewed from outside the combustor.

FIG. 3B is an enlarged view illustrating the relevant part of the wall cooling system of the combustor illustrated in FIG. 1 and is a sectional view taken along line B-B in FIG. 3C.

FIG. 3C is an enlarged view illustrating the relevant part of the wall cooling system of the combustor illustrated in FIG. 1 and is a schematic plan view of the wall cooling system in FIGS. 3A and 3B as viewed from outside the combustor.

FIG. 11A is a diagram illustrating a sixth modification including a partition wall, showing a schematic plan view illustrating an example of the arrangement of cooling passages and cooling air inlets/outlets in the wall of the combustor.

DESCRIPTION OF EMBODIMENTS

An embodiment of a cooling structure for a recovery-type air-cooled gas turbine combustor according to the present invention will hereinafter be described with reference to the drawings.

Figure 4:
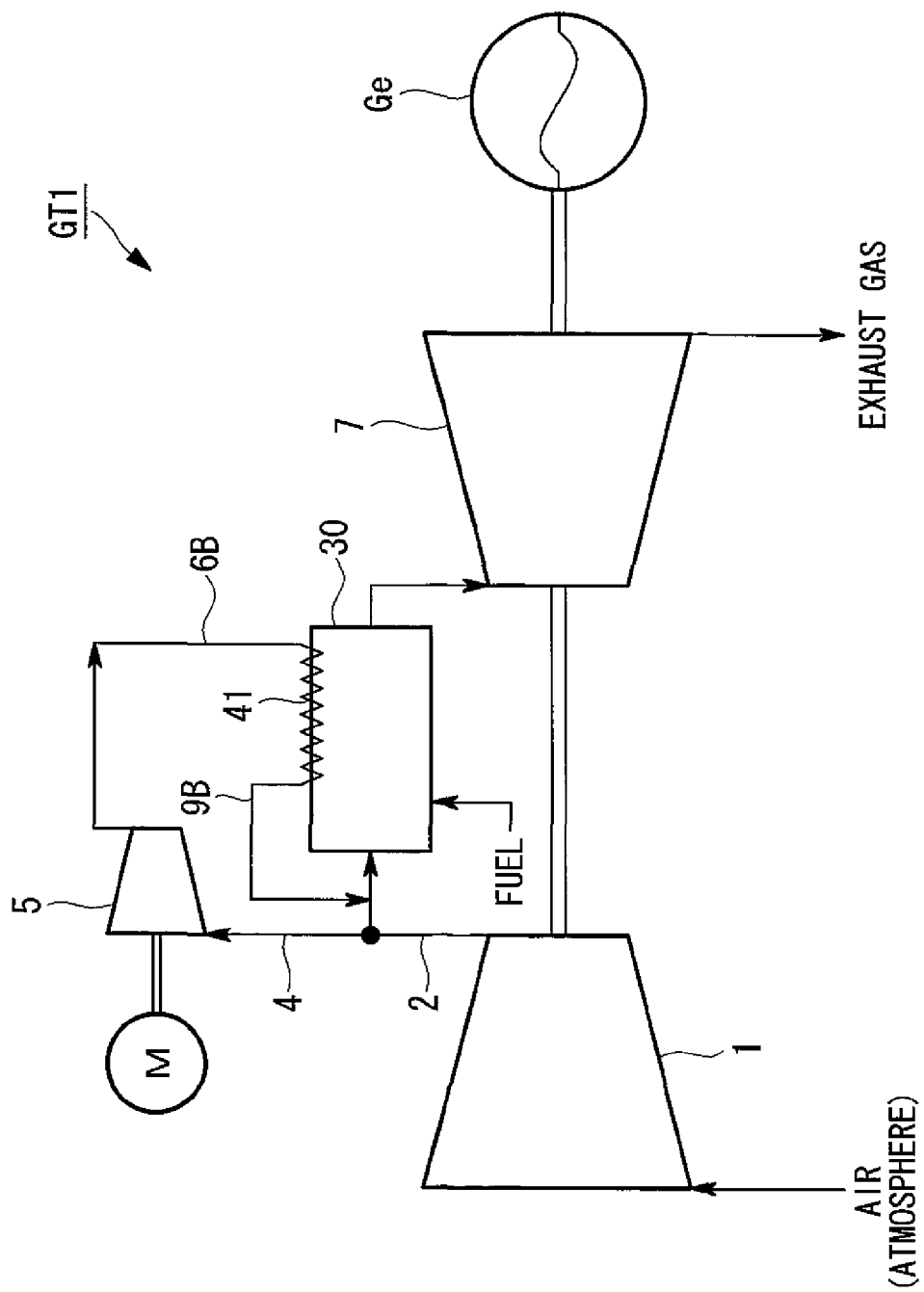
FIG. 4 is a diagram illustrating an example of the configuration of a gas turbine that performs recovery-type air cooling on a wall of a combustor.
Figure 5:
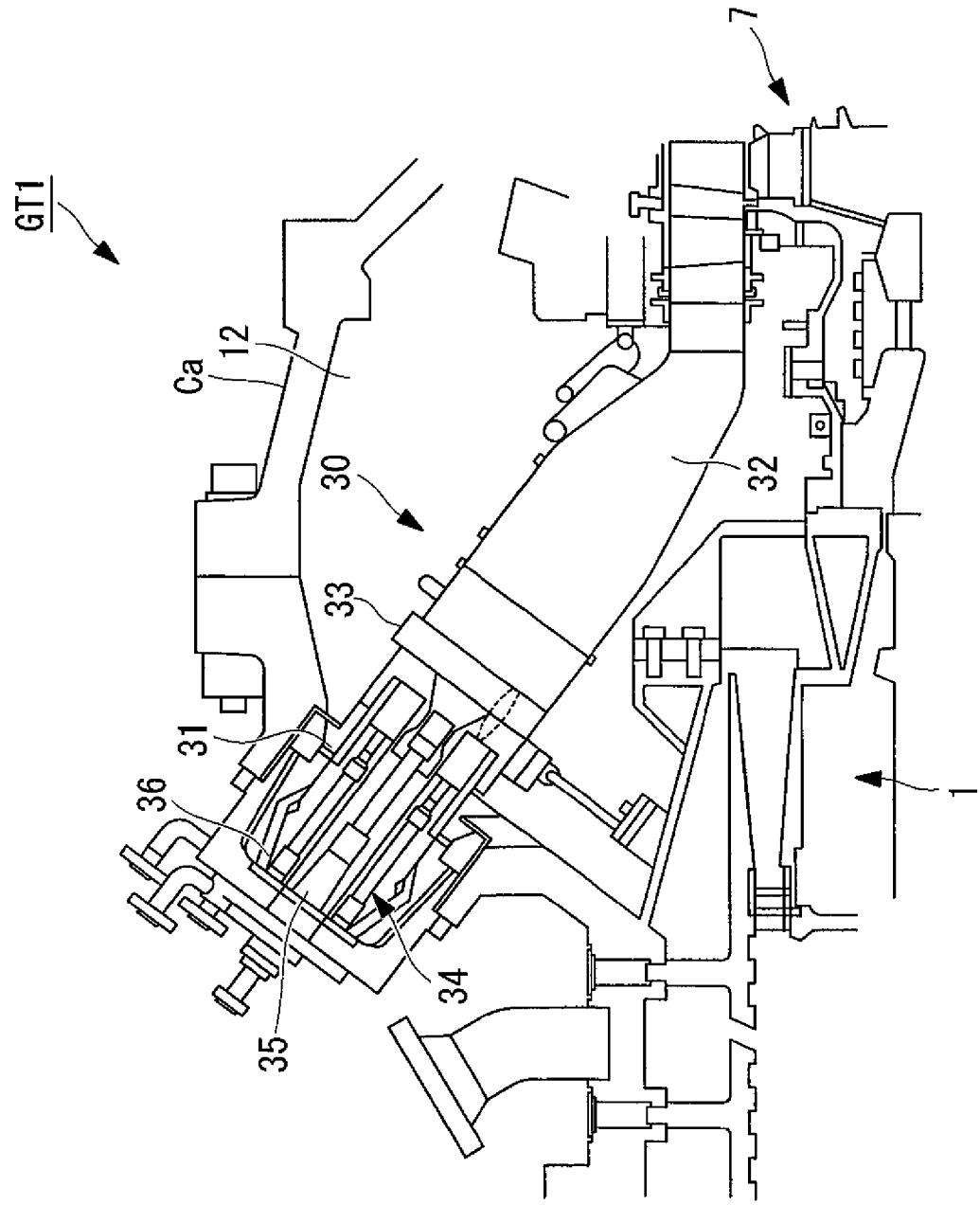
FIG. 5 is a diagram illustrating an example of the structure of the combustor of the gas turbine and the surrounding thereof.

FIG. 4 is a schematic configuration diagram illustrating a gas turbine according to this embodiment, and FIG. 5 is a sectional view illustrating an example of the surrounding structure of a combustor of the gas turbine. The illustrated gas turbine drives a generator, although it is not limited thereto.

As shown, a gas turbine GT1 is composed of a compressor 1, a combustor 30, and a turbine 7 to which a generator Ge is coupled.

The compressor 1 compresses air taken in from the atmosphere. The main flow of the compressed air is supplied to the combustor 30 through a compressed-air supply passage 2.

The combustor 30 burns fuel with the compressed air compressed by the compressor 1 to produce a high-temperature, high-pressure combustion gas. The combustion gas is supplied to the turbine 7.

The turbine 7 has alternating rows of stator blades and rotor blades in a turbine housing thereof. The turbine 7 allows the combustion gas to flow between the stator blades and the rotor blades to rotate a rotor to which the rotor blades are affixed, thereby producing driving force for the generator Ge.

The gas turbine GT1 discussed above includes a pressurizing device 5 that bleeds a portion of the compressed air compressed by the compressor 1 and that pressurizes the portion to a pressure higher than that of the compressed air. The pressurizing device 5 is disposed in a branch passage 4 that branches off at some location from the compressed-air supply passage 2 and through which a portion of the compressed air is bled, and is driven by an electric motor M.

The bled and pressurized air pressurized by the pressurizing device 5 is supplied through a pressurized-air passage 6B to the combustor 30, where it is used as cooling air for cooling the wall of the combustor 30. The bled and pressurized air that has thus been used for cooling the wall of the combustor 30 returns through a return passage 9B to the compressed-air supply passage 2, merges with the main flow of the compressed air through the compressed-air supply passage 2, and is reused as the combustion air for burning the fuel in the combustor 30.

Thus, the gas turbine GT1 discussed above includes a recovery-type air-cooling structure that cools the wall of the combustor 30 using the bled and pressurized air, which is supplied from the compressor 1, bled upstream of the combustor 30, and pressurized and that recovers the bled and pressurized air and reuses it as the combustion air for burning the fuel in the combustor 30 together with the main flow of the compressed air. Although the illustrated recovery-type air-cooling structure uses the bled and pressurized air only to cool the wall of the combustor 30, it may also be used for cooling of the stator blades 8 and the rotor blades 10 of the turbine 7 as in the related art discussed above.

The combustor 30 has a substantially cylindrical shape; for example, as shown in FIG. 5, a plurality of combustors 30 are accommodated and installed in a housing inner space 12 formed in a housing (casing) Ca of the gas turbine GT1 and are arranged circumferentially around the rotor. Each combustor 30 includes an inner cylinder 31, a tailpipe 32, and an acoustic liner 33, and a combustion burner 34 is disposed in the inner cylinder 31.

The combustion burner 34 includes a pilot burner 35 disposed in the center thereof and a plurality of main burners 36 arranged around the pilot burner 35.

The compressed air compressed by the compressor 1 is introduced into and fills the inner space 12 of the housing Ca in which the combustors 30 are installed.

The compressed air introduced into the housing inner space 12 flows from the upstream portions (closer to the combustion burners 34) of the combustors 30 into the inner cylinders 31, where the compressed air is mixed with the fuel supplied from the combustion burners 34 and is burned. This burning produces a high-temperature, high-pressure combustion gas that is supplied through the tailpipes 32 to the turbine 7 located downstream.

Figure 1:
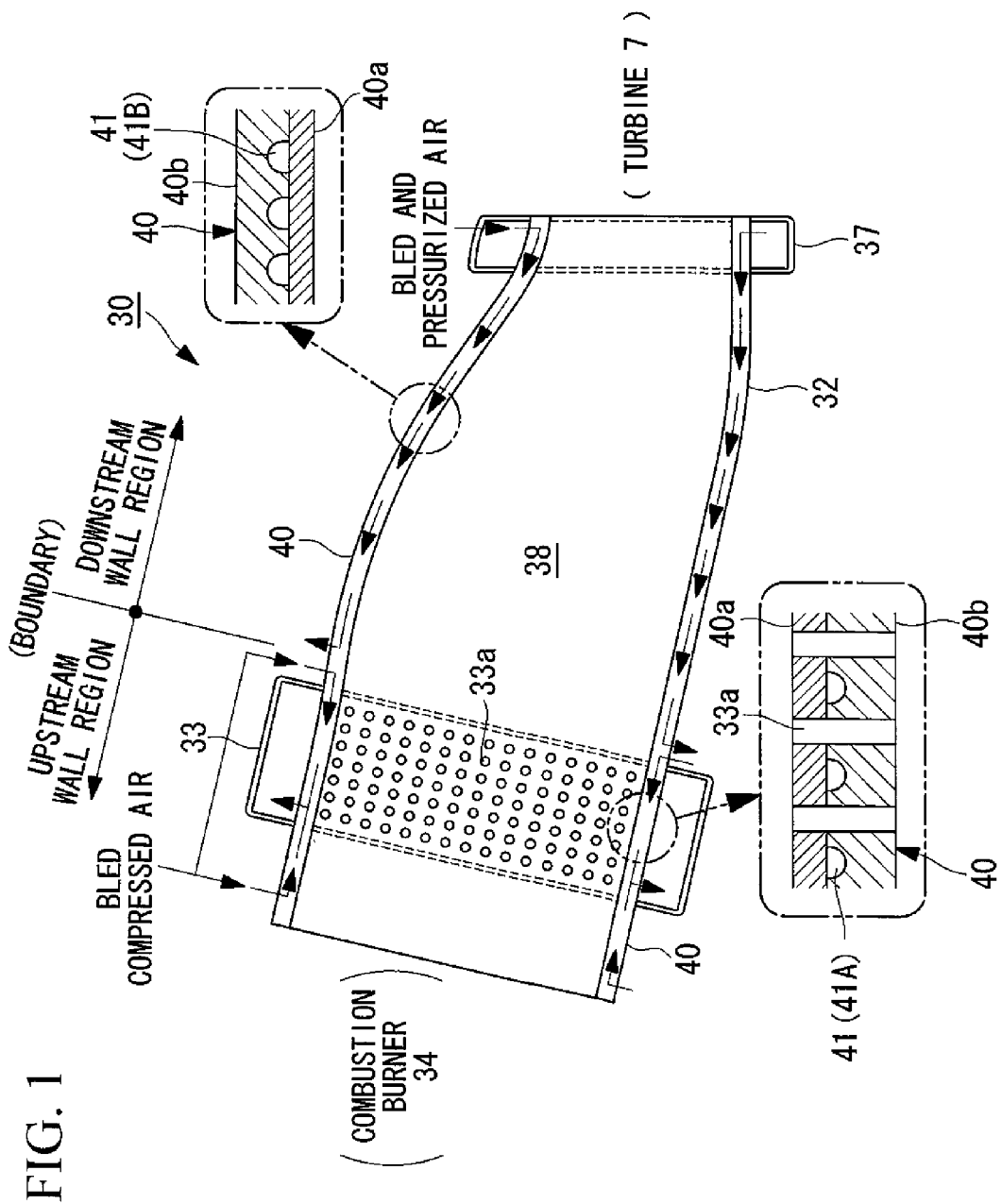
FIG. 1 is a sectional view illustrating a wall cooling system of a combustor as an embodiment of a cooling structure for a recovery-type air-cooled gas turbine combustor according to the present invention.
Figure 2A:
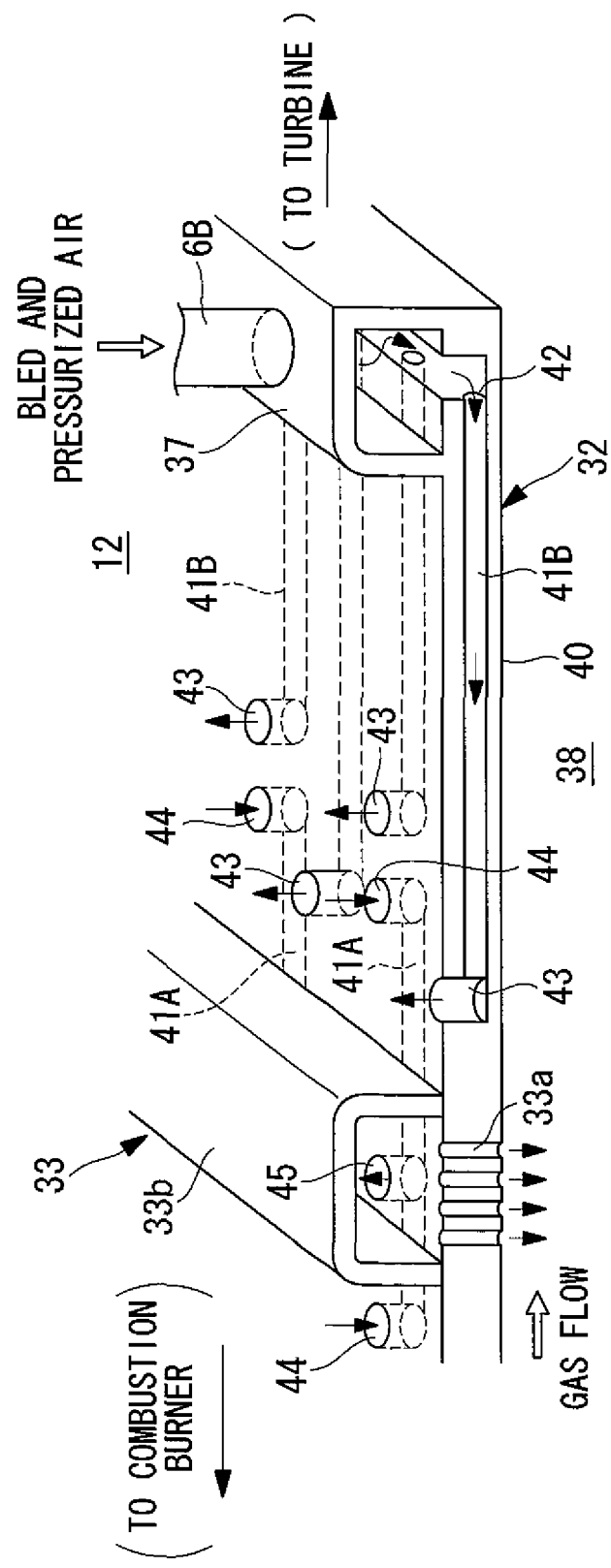
FIG. 2A is an enlarged view illustrating a relevant part of the wall cooling system of the combustor illustrated in FIG. 1 and is a sectional perspective view illustrating the wall cooling system from the upstream side to the downstream side thereof.
Figure 3A:
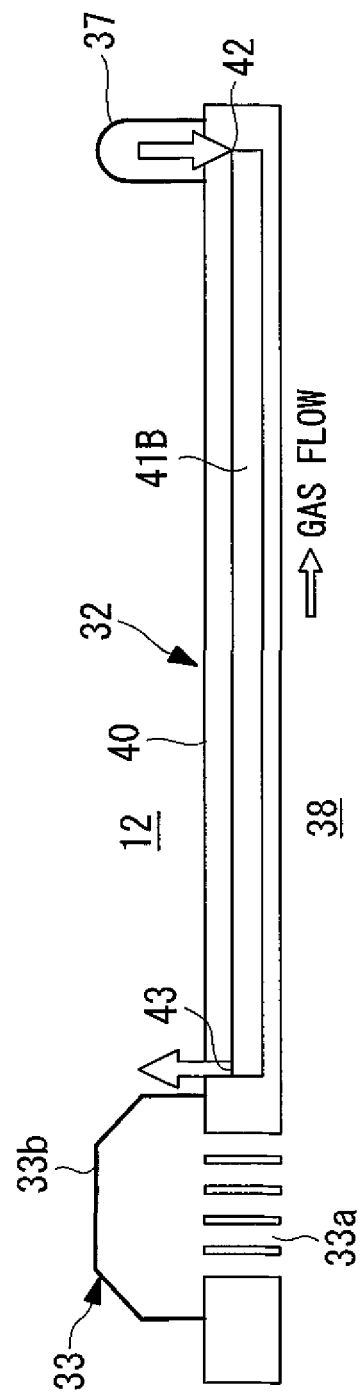
FIG. 3A is an enlarged view illustrating the relevant part of the wall cooling system of the combustor illustrated in FIG. 1 and is a sectional view taken along line A-A in FIG. 3C.

For example, as illustrated in FIG. 1, each combustor 30 of the gas turbine GT1 performs wall cooling by supplying cooling air to cooling air passages 41 formed in a wall 40 of the combustor 30, and the combustor 30 includes a downstream wall region, closer to the turbine 7, that is cooled using the bled and pressurized air as the cooling air and an upstream wall region, closer to the combustion burner 34, that is cooled using, as the cooling air, the bled compressed air bled from the main flow of the compressed air through the inner space 12 of the housing Ca.

In the embodiment illustrated in FIGS. 1 to 3C, the wall 40 forming the tailpipe 32 of the combustor 30 has a double-walled structure including an inner wall 40a and an outer wall 40b that are brazed together, and for example, grooves formed on the outer wall 40b, which is thicker, and extending in the axial direction (longitudinal direction) of the combustor 30 form cooling air passages 41 after the inner wall 40a is brazed thereto. The combustor 30 has a large number of cooling air passages 41 arranged adjacently in parallel in the circumferential direction thereof. In the figures, reference sign 33a is an acoustic hole passing through the wall 40.

In this embodiment, the boundary between the upstream region, which is cooled with the bled compressed air, and the downstream region, which is cooled with the bled and pressurized air, lies closer to the turbine 7 than the acoustic liner 33 does and is near the end of the acoustic liner 33 closer to the turbine 7. Accordingly, the cooling air passages 41 are divided into bled-compressed-air cooling passages (hereinafter referred to as "compressed cooling passages") 41A through which the bled compressed air flows and bled-and-pressurized-air cooling passages (hereinafter referred to as "pressurized cooling passages") 41B through which the bled and pressurized air flows.

In the downstream wall region, the bled and pressurized air introduced from near the trailing end of the tailpipe 32 flows into the pressurized cooling passages 41B and exits from near the end of the acoustic liner 33 closer to the turbine 7 into the housing inner space 12.

Specifically, the bled and pressurized air is directed through the pressurized-air passage 6B into a manifold 37 disposed near the trailing end of the tailpipe 32. In the manifold 37, bled-and-pressurized-air inlet holes (hereinafter referred to as "pressurized inlet holes") 42 are provided from passage to passage as the inlets of the pressurized cooling passages 41B through which the bled and pressurized air flows in the wall 40.

As the outlets of the pressurized cooling passages 41B, bled-and-pressurized-air outlet holes (hereinafter referred to as "pressurized outlet holes") 43 are provided closer to the turbine 7 than the acoustic liner 33 is and near the end of the acoustic liner 33 closer to the turbine 7.

Therefore, the bled and pressurized air flowing from the manifold 37 into the pressurized inlet holes 42 flows through the pressurized cooling passages 41B toward the acoustic liner 33 to cool the wall 40, and the bled and pressurized air whose temperature has risen flows out of the pressurized outlet holes 43 into the housing inner space 12. The high-temperature bled and pressurized air flowing out into the housing inner space 12 merges with the compressed air filling the housing inner space 12 and is reused as combustion air.

In the upstream wall region, the compressed air in the housing inner space 12 is bled from near the ends of the acoustic liner 33 closer to the turbine 7 and the burner 34, and the bled compressed air flows through the compressed cooling passages 41A into the interior of the acoustic liner 33.

Specifically, the acoustic liner 33 has numerous acoustic holes 33a passing through the wall 40 inside a liner body 33b extending in the circumferential direction of the combustor 30. The compressed cooling passages 41A, therefore, are provided at positions where the acoustic holes 33a are not formed.

The compressed cooling passages 41A have bled-compressed-air inlet holes (hereinafter referred to as "compressed inlet holes") 44 provided outside and near the ends of the liner body 33b and bled-compressed-air outlet holes (hereinafter referred to as "compressed outlet holes") 45 provided inside the liner body 33b in the center of the upstream wall region. Therefore, the compressed air filling the housing inner space 12 is bled from the compressed inlet holes 44 near the liner body 33b and flows through the compressed cooling passages 41A to cool the wall 40 in the region around the acoustic liner 33, and the bled compressed air whose temperature has risen flows out of the compressed outlet holes 45 into the acoustic liner 33 and flows through the acoustic holes 33a into a combustion chamber 38 of the combustor 30, where it is used for combustion.

Thus, by performing wall cooling using the bled and pressurized air in the downstream wall region and wall cooling using the bled compressed air in the upstream wall region, wall cooling using the bled and pressurized air, which is at a relatively low temperature, can be performed in the region of the tailpipe 32 of the combustor 30 closer to the turbine 7 (downstream wall region), which is at a relatively high temperature, and wall cooling using the bled compressed air can be performed in the region of the tailpipe 32 of the combustor 30 closer to the combustion burner 34 (upstream wall region), which is at a relatively low temperature.

This allows the bled and pressurized air and the bled compressed air that have been used as cooling air for wall cooling of the combustor 30 to be reused together as combustion air, thus allowing for efficient wall cooling of the combustor 30 and reduced emissions of nitrogen oxides during combustion. That is, because the pressurized compressed air is supplied as cooling air from near the outlet (downstream) of the tailpipe 32, which is exposed to a higher heat load, the cooling air can be effectively utilized to perform wall cooling.

In addition, because the upstream wall region, which is cooled using the bled compressed air, is provided, the amount of bled and pressurized air can be reduced, which allows for a reduction in the size of the pressurizing device 5 and a reduction in the power consumed for driving.

The pressurized outlet holes 43 and compressed inlet holes 44 described above are adjacent to each other in the longitudinal direction (combustion gas flow direction) of the combustor 30 near the boundary between the upstream wall region and the downstream wall region.

In this case, the pressurized outlet holes 43 and the compressed inlet holes 44 may be arranged respectively in lines in the circumferential direction of the combustor 30, although a staggered arrangement is desirable. Such a staggered arrangement disperses the pressurized outlet holes 43, from which the high-temperature bled and pressurized air flows out, so that efficient wall cooling can be performed near the boundary between the upstream wall region and the downstream wall region downstream of the acoustic liner 33 in the combustion gas flow direction, where the pressurized outlet holes 43 are provided.

However, because the pressurized outlet holes 43, from which the high-temperature air flows out after cooling, and the compressed inlet holes 44, into which the low-temperature air flows before cooling, are adjacent to each other near the boundary between the upstream wall region and the downstream wall region downstream of the acoustic liner 33, if both are close to each other, airflows having a temperature difference might be mixed. Such mixing might increase the temperature of the bled compressed air flowing into the compressed inlet holes 44 before cooling, thus decreasing the capacity for cooling the upstream wall region of the wall 40 in which the compressed cooling passages 41A are formed to supply the bled compressed air for wall cooling.

Therefore, according to a modification of this embodiment, at least the pressurized cooling passages 41B, which supply the bled and pressurized air to the pressurized outlet holes 43 provided on the side of the acoustic liner 33 closer to the turbine 7 and near the boundary between the upstream wall region and the downstream wall region, and/or the compressed cooling passages 41A, which direct the bled compressed air introduced from the compressed inlet holes 44 into the acoustic liner 33, include turn-back portions 50 that couple together the cooling passages adjacent to each other in the circumferential direction of the combustor 30 on the side of the acoustic liner 33 closer to the turbine 7 and near the boundary between the upstream wall region and the downstream wall region.

These turn-back portions 50 allow the opening positions of the adjacent pressurized outlet holes 43 and compressed inlet holes 44 near the boundary to be spaced apart from each other to prevent or inhibit mixing of the bled and pressurized air and the bled compressed air so that the temperature of the bled compressed air that cools the upstream wall region does not rise. It is also desirable to route the turn-back portions 50 so as to substantially uniformly cover the region near the boundary between the upstream wall region and the downstream wall region to perform wall cooling using the bled and pressurized air or the bled compressed air.

Figure 6A:
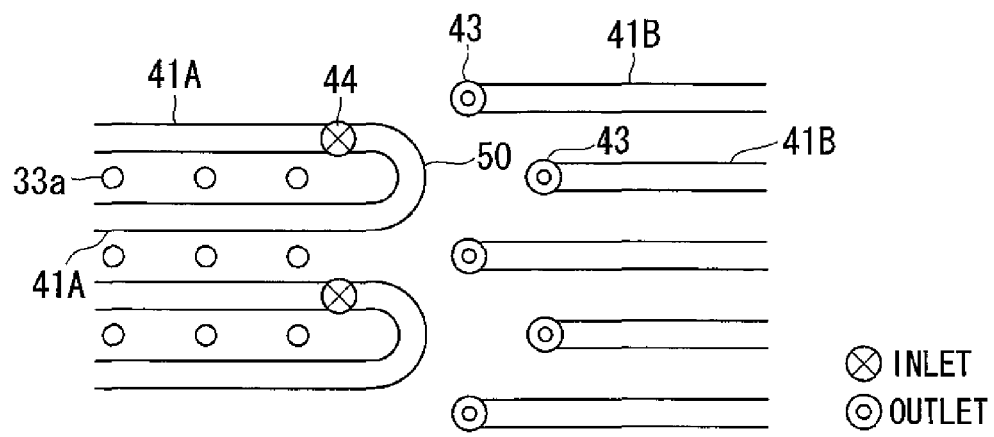
FIG. 6A illustrates a first modification illustrating an example of the arrangement of cooling passages and cooling air inlets/outlets in the wall of the combustor, showing a pattern in which turn-back portions are provided for bled-compressed-air cooling passages and in which bled-compressed-air inlet holes are differently arranged.
Figure 6B:
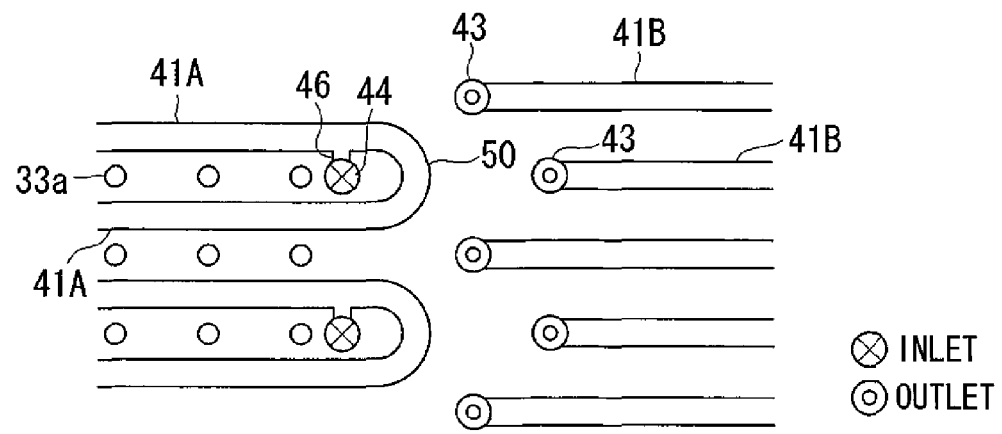
FIG. 6B illustrates a first modification illustrating an example of the arrangement of cooling passages and cooling air inlets/outlets in the wall of the combustor, showing a pattern in which the turn-back portions are provided for the bled-compressed-air cooling passages and in which the bled-compressed-air inlet holes are differently arranged.
Figure 6C:
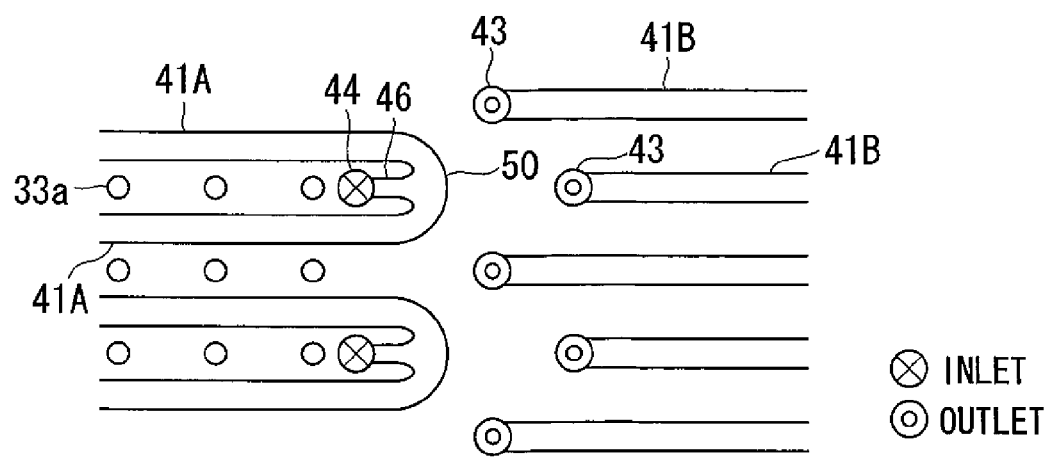
FIG. 6C illustrates a first modification illustrating an example of the arrangement of cooling passages and cooling air inlets/outlets in the wall of the combustor, showing a pattern in which the turn-back portions are provided for the bled-compressed-air cooling passages and in which the bled-compressed-air inlet holes are differently arranged.

A first modification illustrated in FIGS. 6A to 6C includes substantially U-shaped turn-back portions 50 for the compressed cooling passages 41A. Specifically, the ends of two adjacent compressed cooling passages 41A closer to the turbine 7 are coupled together in a U-shape, and the compressed inlet holes 44 are provided at positions spaced apart from the pressurized outlet holes 43 so that little high-temperature bled and pressurized air is mixed.

In FIG. 6A, because the pressurized outlet holes 43 are provided at positions spaced apart from the acoustic liner 33 toward the trailing end of the tailpipe, the turn-back portions 50 are provided so as to protrude towards the wall region where no pressurized outlet holes 43 are provided. Therefore, the bled compressed air flowing through the turn-back portions 50 flows so as to substantially uniformly cover the region near the boundary between the upstream wall region and the downstream wall region to cool the wall region where no pressurized outlet holes 43 are provided. That is, because the turn-back portions 50 are formed so as to flow through the region separated from the opening positions of the pressurized outlet holes 43 and the compressed inlet holes 44 to cover the empty wall region where no pressurized outlet holes 43 or compressed inlet holes 44 are provided, substantially uniform wall cooling is also possible near the boundary between the upstream wall region and the downstream wall region.

In the examples illustrated in FIGS. 6B and 6C, cooling branch passages 46 that branch off from the compressed cooling passages 41A coupled together by the turn-back portions 50 are formed, and the compressed inlet holes 44 are provided at the ends of the cooling branch passages 46. By providing the cooling branch passages 46, the arrangement of the compressed inlet holes 44 relative to the pressurized outlet holes 43 can be easily optimized. The branch positions etc. of the cooling branch passages 46 are not limited to those of the illustrated examples.

Figure 7:
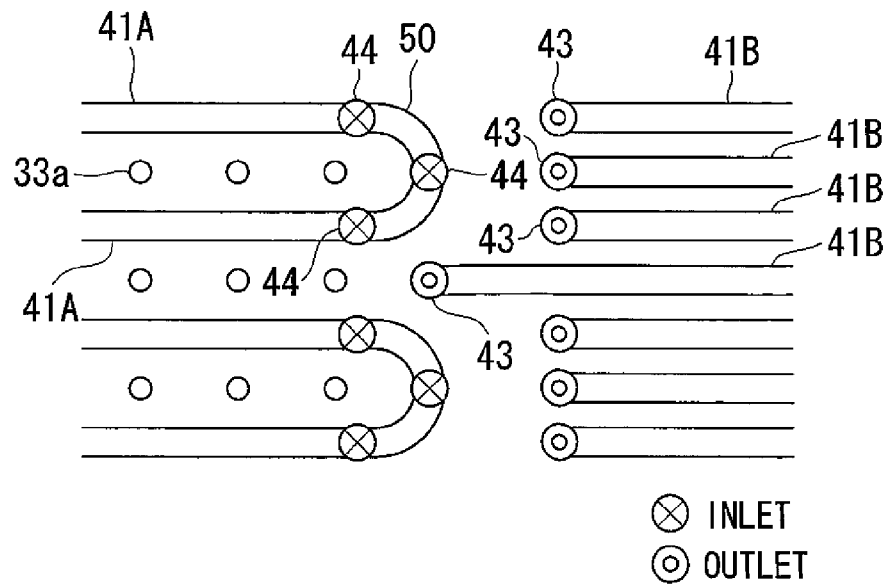
FIG. 7 illustrates a second modification illustrating an example of the arrangement of cooling passages and cooling air inlets/outlets in the wall of the combustor, showing a pattern in which the turn-back portions are provided for the bled-compressed-air cooling passages and in which bled-and-pressurized-air outlet holes are differently arranged.

A second modification illustrated in FIG. 7 differs from the example in FIG. 6A discussed above in the arrangement of the pressurized outlet holes 43 and the compressed inlet holes 44. In this case, three pressurized outlet holes 43 corresponding to each turn-back portion 50 are arranged linearly in the circumferential direction of the combustor 30, and at the positions between two adjacent turn-back portions 50, the pressurized outlet holes 43 are provided by extending the pressurized cooling passages 41B toward the acoustic liner 33. In addition, the compressed inlet holes 44 are provided at three positions, rather than at one position as in FIG. 6A.

Figure 8:
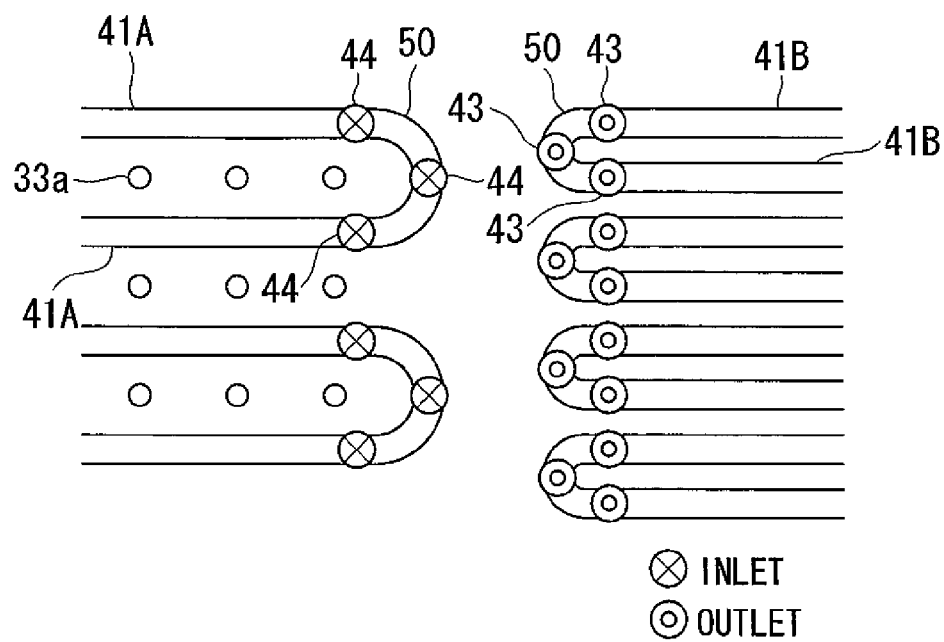
FIG. 8 illustrates a third modification illustrating an example of the arrangement of cooling passages and cooling air inlets/outlets in the wall of the combustor, showing a pattern in which the turn-back portions are provided for both the bled-and-pressurized-air cooling passage and the bled-compressed-air cooling passages.

A third modification illustrated in FIG. 8 differs from the modification in FIG. 7 discussed above in the structure of the pressurized cooling passages 41B. In this case, the substantially U-shaped turn-back portions 50 are also provided for the pressurized cooling passages 41B, and the number and arrangement of the pressurized outlet holes 43 differ.

Figure 9:
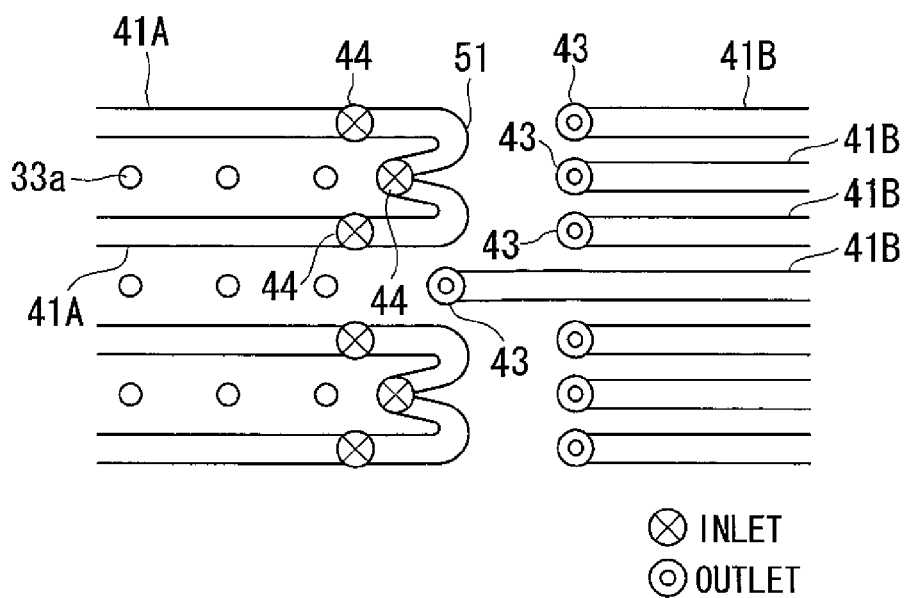
FIG. 9 illustrates a fourth modification illustrating an example of the arrangement of cooling passages and cooling air inlets/outlets in the wall of the combustor, showing a pattern in which the turn-back portions provided for the bled-compressed-air cooling passages are differently routed.

A fourth modification illustrated in FIG. 9 has the substantially U-shaped turn-back portions 50 in FIG. 7 discussed above replaced by substantially M-shaped turn-back portions 51.

Figure 10:
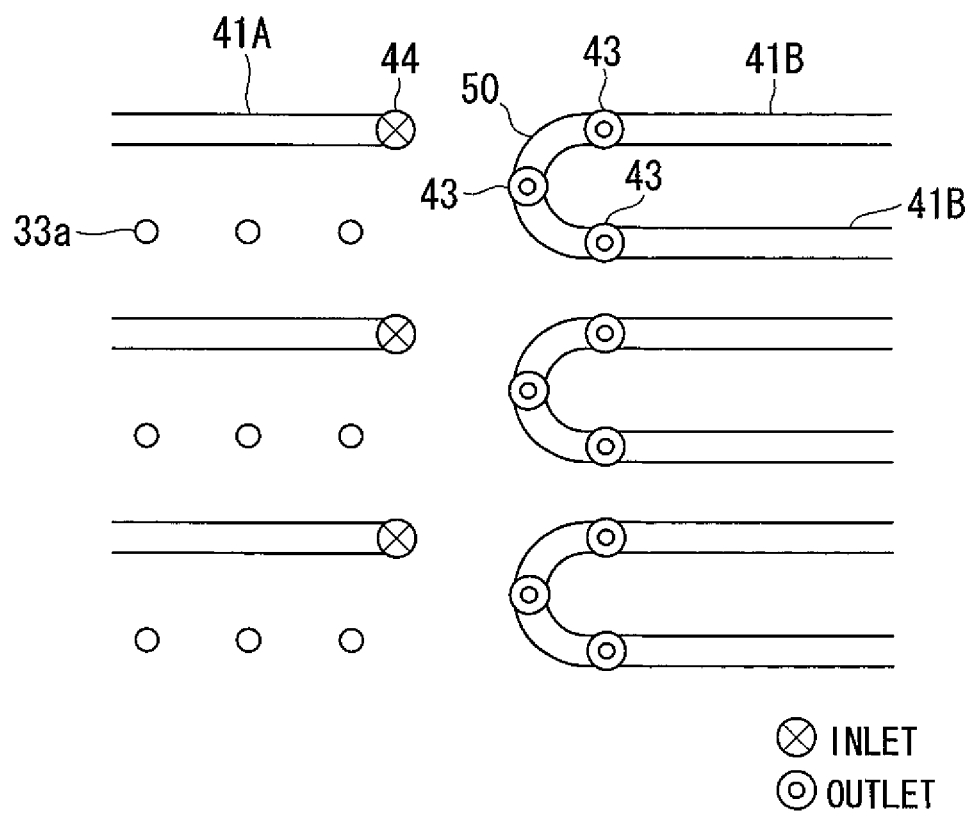
FIG. 10 illustrates a fifth modification illustrating an example of the arrangement of cooling passages and cooling air inlets/outlets in the wall of the combustor, showing a pattern in which the turn-back portions are provided for the bled-and-pressurized-air cooling air.

A fifth modification illustrated in FIG. 10 differs from the modification in FIG. 8 discussed above in that the substantially U-shaped turn-back portions 50 are provided only for the pressurized cooling passages 41B.

Thus, the substantially U-shaped turn-back portions 50 discussed above can be provided for the compressed cooling passages 41A or the pressurized cooling passages 41B, or both. In addition, the turn-back portions 50 are not necessarily substantially U-shaped, but may have any other shape, including the substantially M-shaped turn-back portions 51 and substantially S-shaped turn-back portions.

That is, the turn-back portions 50 may be selected from the modifications illustrated in FIGS. 6 to 10 and combinations thereof so that the distances between the pressurized outlet holes 43 and the compressed inlet holes 44 are optimized and that the turn-back portions 50 pass through and cover the empty wall region to allow substantially uniform wall cooling near the boundary between the upstream wall region and the downstream wall region.

Figure 11B:
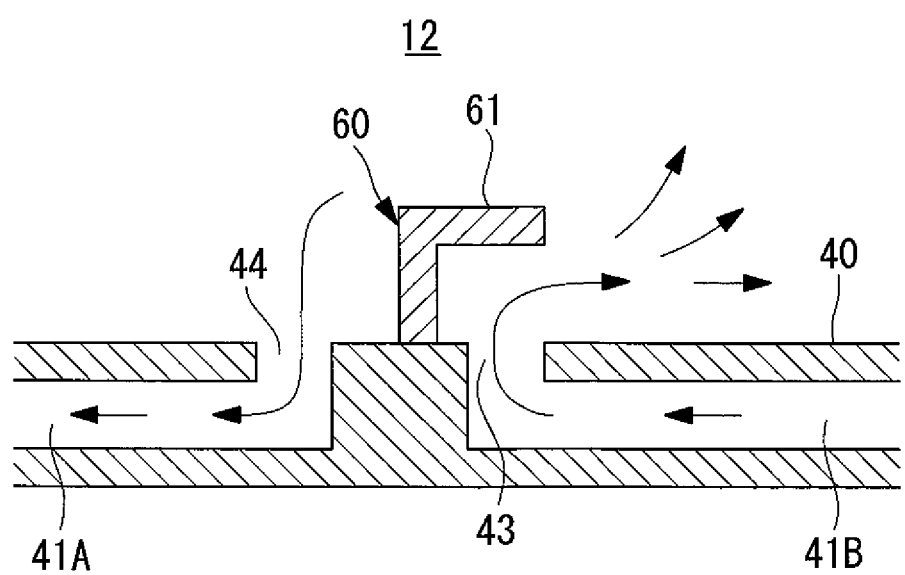
FIG. 11B is a sectional view taken along line C-C of FIG. 11A.

A sixth modification including a partition wall will then be described based on FIGS. 11A and 11B. The portions similar to those of the embodiment and modifications thereof described above are indicated by the same reference signs, and a detailed description thereof is omitted.

In this modification, a partition wall 60 protruding from the wall 40 of the combustor 30 is provided between the pressurized outlet holes 43 and the compressed inlet holes 44 near the boundary between the upstream wall region and the downstream wall region. This partition wall 60 protrudes from the wall 40 into the housing inner space 12 to reliably prevent the bled and pressurized air flowing out of the pressurized outlet holes 43, which is at a higher temperature, from being mixed with the bled compressed air flowing into the compressed inlet holes 44, which is at a lower temperature. That is, the partition wall 60 is a wall member that separates the flow of the bled and pressurized air out of the pressurized outlet holes 43 from the flow of the bled compressed air into the compressed inlet holes 44, thus allowing both airflows to be reliably separated without being mixed together.

The illustrated structure includes a guide portion 61 formed by bending the end of the partition wall 60 toward the trailing end of the tailpipe 32 (toward the turbine 7). This guide portion 61 forms a guide surface substantially parallel to the wall 40 to guide the flow of the bled and pressurized air out of the pressurized outlet holes 43 toward the downstream side facing away from the compressed inlet holes 44 (toward the trailing end of the tailpipe 32), thus more reliably preventing mixing of the bled and pressurized air and the bled compressed air.

This partition wall 60 is applicable to the embodiment and modifications thereof described above, any of which produces a synergetic effect to allow for more efficient wall cooling of the combustor 30.

In the embodiment and modifications thereof described above, as shown in FIGS. 2B and 11A, the ratio (P/d) of the pitch (P) of the adjacent pressurized outlet holes 43 and compressed inlet holes 44 near the boundary between the upstream wall region and the downstream wall region in the longitudinal direction of the combustor 30 to the diameter (d) of the pressurized outlet holes 43 is preferably set to 2 or more (P/d≥2).

Figure 12:
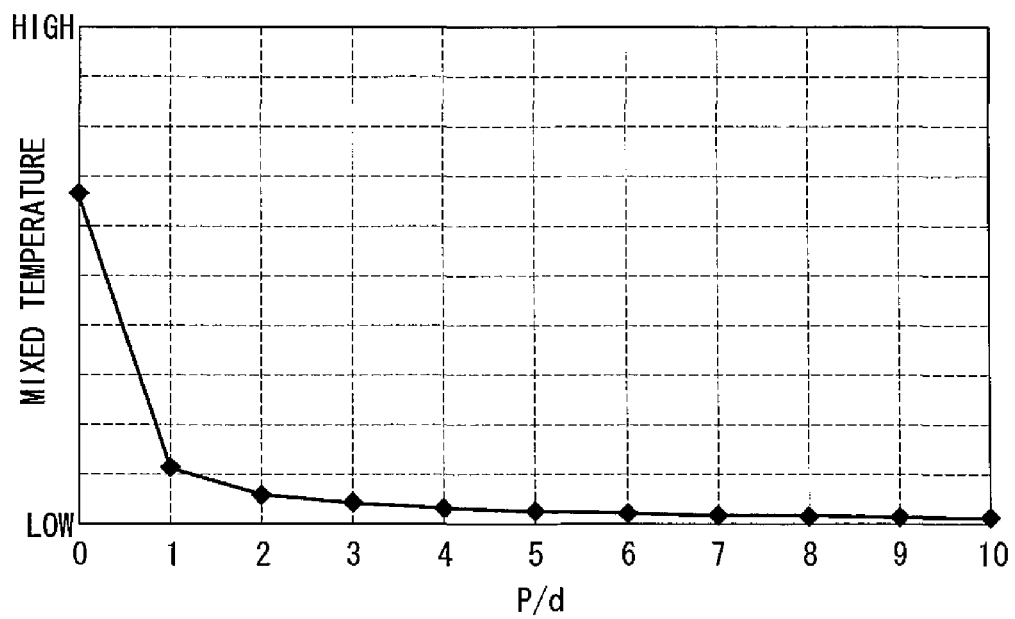
FIG. 12 is a graph showing the relationship between the ratio (P/d) of the pitch (P) of adjacent bled-and-pressurized-air outlet holes and bled-compressed-air inlet holes to the diameter (d) of the bled-and-pressurized-air outlet holes and the mixed temperature of bled compressed air.

FIG. 12 shows the relationship between the ratio (P/d) of the pitch (P) of the adjacent pressurized outlet holes 43 and compressed inlet holes 44 to the diameter (d) of the pressurized outlet holes 43 and the mixed temperature of the bled compressed air, which represents the mixed state of the bled and pressurized air and the bled compressed air. This figure shows that the mixed temperature varies little as (P/d) is increased to 2 or more.

Thus, if the ratio (P/d) to the diameter (d) of the pressurized outlet holes 43 is 2 or more (P/d≥2), little mixing will occur between the flow of the bled and pressurized air out of the pressurized outlet holes 43 and the flow of the bled compressed air into the compressed inlet holes 44. That is, to prevent mixing of the flow of the bled and pressurized air out of the pressurized outlet holes 43 and the flow of the bled compressed air into the compressed inlet holes 44, the condition (P/d≥2) may be satisfied to provide a sufficient distance between the adjacent pressurized outlet holes 43 and compressed inlet holes 44.

Additionally, in the embodiment and modifications thereof described above, as shown in FIGS. 2B and 11A, it is desirable that the diameter (di) of the compressed inlet holes 44 provided near the boundary between the upstream wall region and the downstream wall region be set to a value larger than the diameter (d) of the pressurized outlet holes 43 (di>d).

Figure 13:
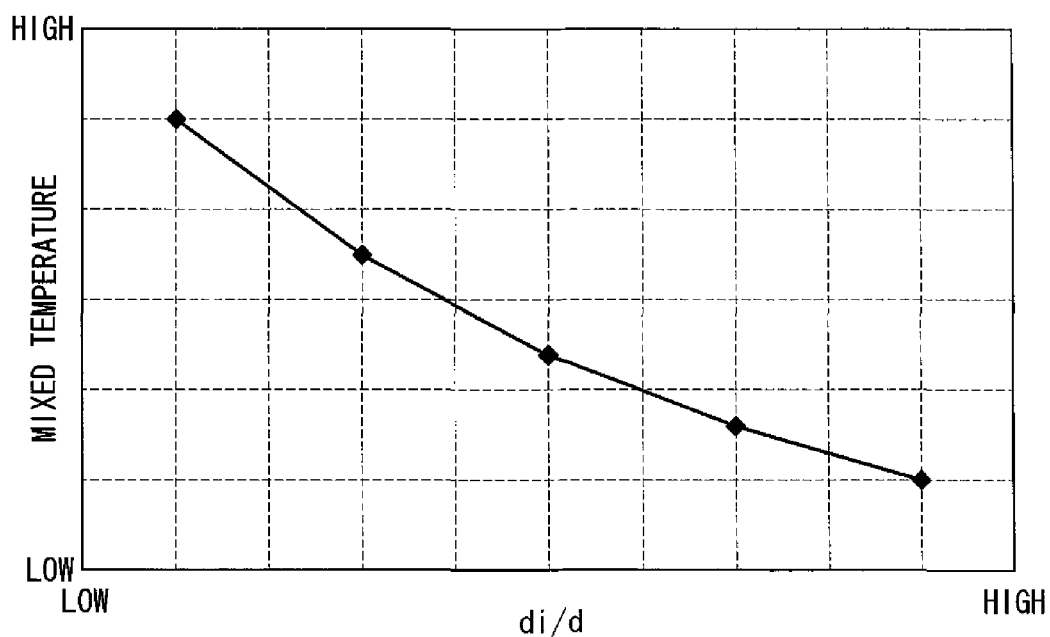
FIG. 13 is a graph showing the relationship between the ratio of the diameter (di) of the bled-compressed-air inlet holes to the diameter (d) of the bled-and-pressurized-air outlet holes and the mixed temperature of the bled compressed air.
Figure 14:
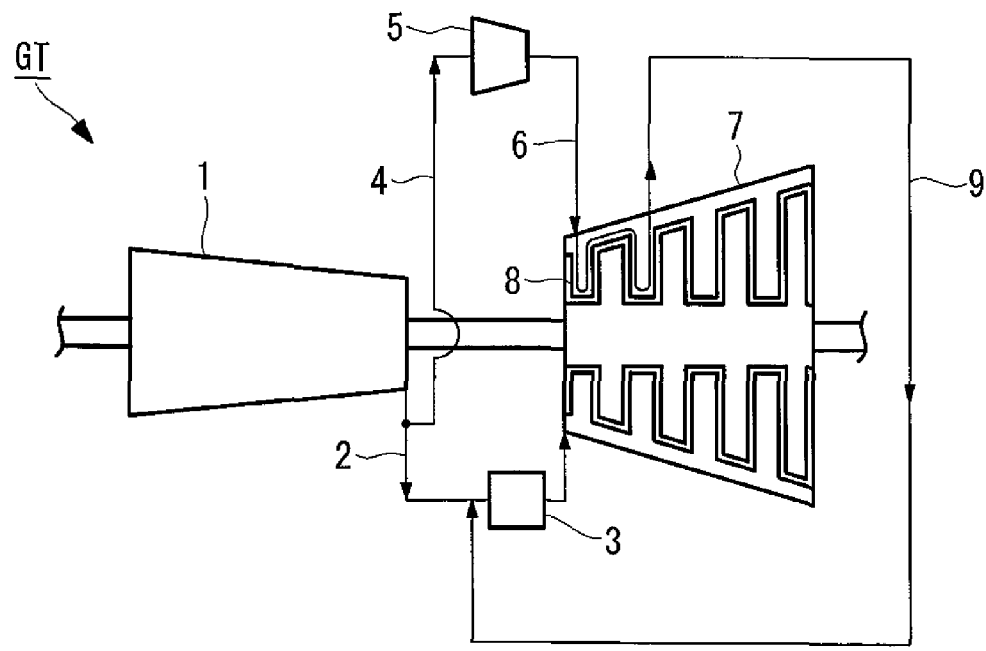
FIG. 14 is a diagram of an air cooling system for cooling stator blades of a turbine using compressed air as an example of a recovery-type air cooling system applied to gas turbines in the related art.
Figure 15:
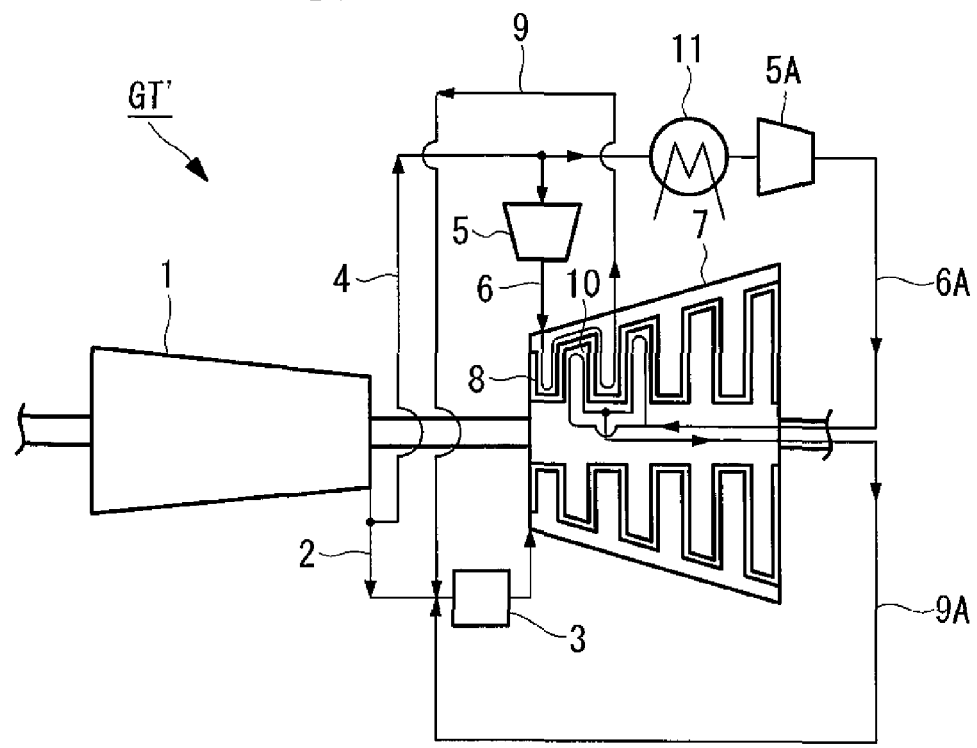
FIG. 15 is a diagram of an air cooling system for cooling stator blades and rotor blades of a turbine using compressed air as an example of a recovery-type air cooling system applied to gas turbines in the related art.

FIG. 13 shows the relationship between the ratio of the diameter (di) of the compressed inlet holes 44 to the diameter (d) of the pressurized outlet holes 43 and the mixed temperature of the bled compressed air, which represents the mixed state of the bled and pressurized air and the bled compressed air. This figure shows that the mixed temperature decreases as the ratio of both diameters (di/d) increases.

This demonstrates that less mixing occurs as the diameter (di) is increased relative to the diameter (d) of the pressurized outlet holes 43. This is presumably because the bled and pressurized air flowing out of the pressurized outlet holes 43, which have a smaller diameter, has a higher velocity, so that the high-temperature bled and pressurized air tends to flow out into the housing inner space 12 without being mixed with the bled compressed air, which has a lower velocity. As a result, the bled compressed air flowing into the compressed inlet holes 44 tends not to be mixed with the high-temperature bled and pressurized air, thus preventing or inhibiting a temperature rise and providing high cooling capacity.

Thus, according to the embodiment and modifications thereof described above, the compressed air supplied from the compressor 1 can be effectively utilized in the gas turbine GT1, which employs recovery-type air cooling (closed air cooling cycle), to perform wall cooling using the bled and pressurized air in the region of the combustor 30 closer to the turbine 7, which is at a relatively high temperature, and to perform wall cooling using the bled compressed air closer to the combustion burner 34. As a result, the bled and pressurized air that has been used to cool the downstream wall region of the combustor 30 and the bled compressed air that has been used to cool the upstream wall region of the combustor 30 are both effectively reused as combustion air, thus providing a gas turbine having a cooling structure employing recovery-type air cooling that can efficiently cool the wall of the combustor 30.

Although the boundary between the upstream wall region and the downstream wall region is located near the end of the acoustic liner 33 closer to the turbine 7 in the embodiment and modifications thereof described above, the present invention is not limited thereto.

Nevertheless, if the above boundary is near the end of the acoustic liner 33 closer to the turbine 7, the amount of bled and pressurized air (amount of closed-cycle cooling air) can be reduced, which improves the cycle performance of the gas turbine. That is, both the bled and pressurized air and the bled compressed air can be used for cooling of the acoustic liner 33 because they can provide a sufficient pressure difference, and therefore the use of the bled compressed air, which does not need to be pressurized, for cooling is advantageous for improving the cycle performance because, for example, no power is needed for pressurization.

The present invention is not limited to the embodiments described above, but may be modified without departing from the spirit thereof.

REFERENCE SIGNS LIST 1 compressor
3, 30 combustor
5 pressurizing device
7 turbine
12 housing inner space
31 inner cylinder
32 tailpipe
33 acoustic liner
33a acoustic hole
33b liner body
34 combustion burner
37 manifold
38 combustion chamber
40 wall
41 cooling air passage
41A bled-compressed-air cooling passage (compressed cooling passage)
41B bled-and-pressurized-air cooling passage (pressurized cooling passage)
42 bled-and-pressurized-air inlet hole (pressurized inlet hole)
43 bled-and-pressurized-air outlet hole (pressurized outlet hole)
44 bled-compressed-air inlet hole (compressed inlet hole)
45 bled-compressed-air outlet hole (compressed outlet hole)
46 cooling branch passage
50, 51 turn-back portion
60 partition wall
61 guide portion
GT1 gas turbine

The invention claimed is:

1. A cooling structure for a recovery-type air-cooled gas turbine combustor comprising:
first cooling passages formed in a downstream wall region of a wall of the gas turbine combustor, the first cooling passages being configured to cool the downstream wall region of the gas turbine combustor by receiving first cooling air bled from a compressed air supply passage and pressurized; and
second cooling passages formed in an upstream wall region of the wall of the gas turbine combustor, the second cooling passages being configured to cool the upstream wall region of the gas turbine combustor by receiving second cooling air from an inner space of a housing in which the gas turbine is installed, the second cooling air being supplied to the inner space of the housing from the compressed air supply passage,
wherein the first cooling air passages are configured so that the first cooling air flows into the first cooling passages and exits into the inner space of the housing,
wherein the second cooling air passages are configured so that the second cooling air is introduced from the inner space of the housing into the second cooling passages, and
wherein the first cooling air introduced into the first cooling passages for cooling the downstream wall region of the gas turbine combustor is supplied to the gas turbine combustor as combustion air for burning fuel.

2. The cooling structure for the gas turbine combustor according to claim 1, wherein:
the first cooling passages include first air inlet holes and first air outlet holes;
the first air inlet holes are provided closer to the turbine relative to the first air outlet holes, which are provided closer to a burner of the gas turbine combustor;
in the first cooling passages, the first cooling air introduced into the first air inlet holes provided closer to the turbine flows out of the first air outlet holes provided closer to the burner in the downstream wall region into the inner space of the housing; and
in the second cooling passages, at least the second cooling air introduced from second air inlet holes provided closer to the turbine in the upstream wall region flows out of second air outlet holes provided in a center of the upstream wall region.

3. The cooling structure for the gas turbine combustor according to claim 2, wherein the first air outlet holes and the second air inlet holes that are adjacent to each other near a boundary between the upstream wall region and the downstream wall region are arranged in a staggered pattern.

4. The cooling structure for the gas turbine combustor according to claim 2, wherein at least the first cooling passages that direct the first cooling air introduced into the first air inlet holes to the first air outlet holes include turn-back portions that couple together the first cooling passages that are adjacent to each other in a circumferential direction of the gas turbine combustor near the boundary.

5. The cooling structure for the gas turbine combustor according to claim 4, wherein the turn-back portions are routed so as to cover a region near the boundary to perform wall cooling using the first cooling air and the second cooling air.

6. The cooling structure for the gas turbine combustor according to claim 4, wherein the second cooling passages, which direct the second cooling air introduced from the second air inlet holes to the second air outlet holes, include turn-back portions that couple together the second cooling passages that are adjacent to each other in a circumferential direction of the gas turbine combustor near the boundary.

7. The cooling structure for the gas turbine combustor according to claim 2, wherein a partition wall protruding from the wall of the combustor is provided between the first air outlet holes and the second air inlet holes.

8. The cooling structure for the gas turbine combustor according to claim 2, wherein a ratio (P/d) of a pitch (P) of the first air outlet holes and the second air inlet holes that are opened and adjacent to each other near the boundary in a longitudinal direction of the combustor to the diameter (d) of the first air outlet holes is set to 2 or more (P/d≥2).

9. The cooling structure for the gas turbine combustor according to claim 2, wherein a diameter (di) of the second air inlet holes is set to a value larger than the diameter (d) of the first air outlet holes (di>d).

10. The cooling structure for the gas turbine combustor according to claim 1, wherein a boundary between the upstream wall region and the downstream wall region is located near an end of an acoustic liner closer to the turbine.

11. The cooling structure for the gas turbine combustor according to claim 1, wherein at least the second cooling passages that direct the second cooling air introduced from the second air inlet holes to the second air outlet holes include turn-back portions that couple together the second cooling passages that are adjacent to each other in a circumferential direction of the gas turbine combustor near the boundary.

* * * * *